United States Patent
Robert et al.

(10) Patent No.: US 7,716,740 B2
(45) Date of Patent: May 11, 2010

(54) ROGUE ACCESS POINT DETECTION IN WIRELESS NETWORKS

(75) Inventors: Jean-Marc Robert, Ottawa (CA); Michel Barbeau, Ottawa (CA)

(73) Assignee: Alcatel Lucent, Paris (FR)

( * ) Notice: Subject to any disclaimer, the term of this patent is extended or adjusted under 35 U.S.C. 154(b) by 1035 days.

(21) Appl. No.: 11/242,884

(22) Filed: Oct. 5, 2005

(65) Prior Publication Data

US 2007/0079376 A1    Apr. 5, 2007

(51) Int. Cl.
*G06F 21/00* (2006.01)

(52) U.S. Cl. .............................. 726/23; 726/4; 702/121; 455/410; 455/411; 455/436; 455/456.1

(58) Field of Classification Search ..................... 726/4, 726/23; 702/121; 455/410, 411, 436, 456.1
See application file for complete search history.

(56) References Cited

U.S. PATENT DOCUMENTS

| | | | | |
|---|---|---|---|---|
| 5,903,832 | A * | 5/1999 | Seppanen et al. | 455/435.3 |
| 6,295,450 | B1 * | 9/2001 | Lyer et al. | 455/436 |
| 7,346,338 | B1 * | 3/2008 | Calhoun et al. | 455/411 |
| 2002/0197979 | A1 * | 12/2002 | Vanderveen | 455/410 |
| 2004/0137917 | A1 | 7/2004 | Ohto et al. | |
| 2004/0152471 | A1 * | 8/2004 | MacDonald et al. | 455/456.1 |
| 2005/0020262 | A1 * | 1/2005 | Kim | 455/435.1 |
| 2005/0128989 | A1 | 6/2005 | Bhagwat | |
| 2005/0130658 | A1 * | 6/2005 | Stephens | 455/436 |
| 2005/0152312 | A1 * | 7/2005 | Marinier et al. | 370/332 |
| 2005/0171720 | A1 * | 8/2005 | Olson et al. | 702/121 |
| 2006/0019663 | A1 * | 1/2006 | Cuffaro et al. | 455/436 |
| 2007/0076662 | A1 * | 4/2007 | Jain et al. | 370/331 |
| 2008/0209521 | A1 * | 8/2008 | Malaney | 726/4 |

FOREIGN PATENT DOCUMENTS

| WO | WO 2005-018162 A1 | 2/2005 |
|---|---|---|
| WO | WO 2005/046254 A | 5/2005 |

OTHER PUBLICATIONS

Beyah, R. et al., "Rogue Access Point Detection using Temporal Traffic Characteristics", IEEE Communications Society, Globecome 2004, pp. 2271-2275.

* cited by examiner

*Primary Examiner*—Kieu Oanh Bui
*Assistant Examiner*—Kevin Richards
(74) *Attorney, Agent, or Firm*—Kramer & Amado P.C.

(57) ABSTRACT

Methods to detect rogue access points (APs) and prevent unauthorized wireless access to services provided by a communication network are provided. A mobile station (MS) reports to a serving AP the received signal strength (RSS) for all APs in the area it travels. The serving AP detect a rogue AP based on inconsistencies perceived in the RSS reports, assessed during the handover phase or whilst the communication is active.

22 Claims, 5 Drawing Sheets

ROGUE ACCESS POINT DETECTION IN WIRELESS NETWORKS

FIELD OF THE INVENTION

The invention is directed to communication networks and in particular to rogue AP detection in wireless networks.

BACKGROUND OF THE INVENTION

Wireless networks are one of the fastest growing segments in the worldwide telecommunications market. In a typical wireless (radio) system, mobile subscribers are served by a series of interconnected radio stations, or base stations, each covering a certain geographical area. The base stations are connected to and controlled by a mobile switching center (MSC) which is in turn connected to the wireline (land line) public switched telephone network (PSTN). The mobile subscribers are provided with portable or mobile (car-mounted) telephone units, which are collectively called mobile stations. The base stations represent the entry points, or network access points (APs).

A serious problem which has plagued wireless communications systems is fraud, which results in significant monetary losses for the respective network and service providers. To address this issue, wireless networks use encryption for maintaining the confidentiality of the information exchanged over the air link. Encryption however does not fully address access of unauthorized mobile stations to a network to steal services (e.g. fraudulent use of mobile identification numbers, "roamer" fraud, mobile station "cloning"). A variety of verification and validation systems were developed and installed to detect and prevent these types of fraud. Thus, most tools for securing communications in a wireless system perform authentication for confirming the identity of the mobile station, at registration, call initiation or call reception. Since both authentication and encryption require communication between the remote (visited) network and the home network (where the MS has a permanent registration) in order to obtain mobile-specific information, the authentication of the MS is a complex and sophisticated task.

In addition to mobile fraud, one of the today's most challenging IT security issue is detection and removal of illegal (fraudulent) wireless APs; these are generally referred to as "rogue access points (AP)". Rogue APs are set up by malicious attackers with a view to simply deny access to the network, or to attract traffic towards them and obtain sensitive information from users. This can leave the assets of the company under attack wide open for a casual snooper or a criminal hacker.

Current wireless protocols do not provide authentication mechanisms for determining if the AP is a valid AP or a rogue one, and the attackers take advantage of this vulnerability. For example, when an 802.11 MS attempts to connect to a given network, it scans the environment and looks for APs located nearby, automatically selects the best available AP and connects with it; e.g. Windows XP connects automatically to the best connection possible in the vicinity. At this point, wireless protocols include ways to authenticate the mobile, but not the AP. Due to this behavior, authorized clients of one organization can connect to APs from a neighboring organization. Though the neighbors APs have not intentionally lured the client, these associations can expose sensitive data. The existence of the problem has been documented for GSM networks by Niemi and Nyberg (UMTS Security, Wiley, 2003) and for IEEE 802.16 networks by Johnston and Walker, (Overview of IEEE 802.16 Security, IEEE Security and Privacy Magazine, pp. 40-48, Vol. 2, 2004).

Rogue AP detection is a two step process starting with discovering the presence of an AP in the network, and then proceeding to identify whether it is a rogue one or not. Current methods for discovering the presence of an AP can be classified into Radio Frequency (RF) scanning, AP scanning, or use of wired line inputs. RF scanning, which is suitable for WLANs, is performed by placing RF sensors all over a wired network. These sensors, which are mainly re-purposed APs that only perform packet capture and analysis, detect any wireless device operating in the area and can alert the WLAN administrator. However, a rogue AP may be placed in a dead zone, which is not covered by the sensors, so that it might go unnoticed until more sensors are added. Also, these fixed sensors cannot detect directional rogue APs.

AP scanning implies deploying APs enabled with a scanning device for discovering all APs operating in a nearby area. Though it is a very useful feature, few AP vendors have this functionality implemented in their products. In addition, the ability of an AP enabled with AP scanning is limited to a very short range; rogue APs operating outside this coverage area will go unnoticed.

Generally, the network management software uses the wired side inputs technique to discover APs, which may detect devices connected to a LAN (e.g. SNMP, Telnet, Cisco Discovery Protocol CDP, etc). This approach is reliable and proven as it can detect an AP anywhere in the LAN, irrespective of its physical location. Moreover, wireless Network Management Systems (NMS) can in addition constantly monitor these APs for health and availability. The limitation with this method is that any AP that doesn't support the respective network management software will go unnoticed by the network management software.

Once an AP is discovered, the next step is to identify whether it is a rogue AP or not, which is not an easy task. One of the major difficulties is presented by the fact that the method of attack depends on the type of network. In WiFi/802.11 networks, which uses carrier sense multiple access, the attacker has to capture the identity of a legitimate AP in order to built a message using the identity of a legitimate AP. Once it captures such an authorized identity, the rogue AP waits until the medium is idle and then sends messages to the MS(s).

On a local plane, this problem is addressed by some administrators, who use pre-configured lists with authorized MAC addresses for authorized APs, vendors, media types, or channels, and provide a tool which automatically advises of any newly detected AP that falls outside the authorized. For example, M. K. Chirumamilla, et al. describe such a technique in the paper entitled "Agent Based Intrusion Detection and Response System for Wireless LAN", IEEE International Conference on Communications (ICC), 492-496, 2003. The paper proposes to check MAC addresses extracted from beacons of APs, for membership in such a list of registered APs. Failure to resolve the MAC address is interpreted as a rogue AP attack. This approach is however vulnerable to MAC address spoofing. In addition, the lists must be updated and are sometimes outdated, and thus unreliable.

Furthermore, rogue AP detection does not seem to be addressed in the context of WiMax/802.16 access networks. WiMax/802.16 is a next generation wireless access network technology which is faster (speeds of up to 70M bits per second), provides network coverage over a distance of about 50 km, offers better quality of service and is more secure than previous wireless technologies. Future WiMax products will support mobile wireless connections; for example, Intel plans to integrate WiMax support in notebook computers by 2006 and in mobile phones by 2007. In view of the potential market size for the future WiMax market, and of the current trend of increase in attacks on network security, the problem of rogue AP detection is an important aspect of secure WiMax communication.

However, the rogue AP attacks are an important threat to these networks. In order to succeed, an attacker must be first armed with the identity captured from a legitimate AP, and transmit at the same time with the legitimate AP. The attacker must also transmit a signal that arrives at the targeted MS, i.e. has a receive signal strength (RSS) much stronger than the signal received from any legitimate AP in the area. In this case, the MS receiver automatically reduces its gain in the presence of this strong illegitimate signal, to a point where the legitimate signal appears as background noise. The exact difference in strength between the two signals depends on the receiver sensitivity.

In addition, with this technology, the mutual authentication of the mobile and AP is optional and occurs late in the network access process. As well, security at the physical layer is absent. As such, a rogue AP attack can occur at several points during a dialog between a MS and an AP in WiMax/802.16 access networks.

Other methods of establishing the legitimacy of an AP include that proposed by Beyah et al. in a paper entitled "Rogue Access Point Detection using Temporal Traffic Characteristics" published in the Proc. of IEEE Global Telecommunications Conference (GLOBECOM), pp. 2271-2275, 2004. The paper proposes an approach based on the analysis of the temporal characteristics of the network traffic. It is based on the assumption that the wireless traffic is more random than the wired traffic. However, the method described in Beyah et al. paper proposes discovery of rogue APs by visual inspection of traffic plots, and is not automated. Furthermore, assumptions on traffic characteristics are hard to validate in real networks.

In principle, the current solutions for detecting rogue APs are expensive, rudimentary and easy to circumvent. Therefore, wireless networks need efficient methods to detect the rogue APs in order to prevent malicious attacks.

SUMMARY OF THE INVENTION it is an object of the invention to provide a system for detecting a rogue AP in a wireless access network that alleviates totally or in part the drawbacks of the existing rogue AP detection systems.

Accordingly, the invention provides a method for detecting a rogue access point (AP) in a wireless access network, comprising: a) maintaining at said each AP of said wireless access network, AP data for all APs in a service area; b) requesting, from a mobile station (MS) roaming in said service area, a handover from said serving AP to one of a plurality of candidate APs in said service area; c) collecting, at the MS, AP presence information from all said candidate APs, and reporting said AP presence information to said serving AP; d) determining at said serving AP if said AP presence information is consistent with said AP data maintained at said serving AP; and e) identifying said rogue AP whenever said AP presence information and said AP data are inconsistent.

According to another aspect for the invention, a method for detecting a rogue access point (AP) in a wireless access network is provided. The i) preparing a Voronoi diagram that partitions a plane corresponding to a service area into a plurality of convex polygons, each polygon including a generating point representing the location of an AP in said service area, and every point in a given polygon being closer to its generating point than to any other; and ii) computing for each polygon a minimum distance and a maximum distance between any point of said respective convex region and each other generating point in the Voronoi diagram and storing said minimum and maximum distances.

Still further, the invention is directed to a method for detecting a rogue access point (AP) in a wireless access network, comprising: p) maintaining at each AP of said wireless access network, AP data for all APs in a service area; r) collecting, at a mobile station (MS) roaming in said service area, a data set including received signal strength (RSS) data for all APs in said service area, and reporting said data set to said serving AP; s) determining at said serving AP if said RSS data in said data set is consistent with said AP data maintained at said serving AP; and t) identifying said rogue AP whenever said RSS data in said data set and said AP data are inconsistent.

Advantageously, the method of the invention addresses vulnerabilities in the security of the current wireless systems and can be used for any wireless technology and irrespective of the signal range of the rogue APs. In particular, the system according to the invention can be integrated with the new WiMax equipment. Also, the system and method according to the invention enables an AP to detect, during the hand-over stage, a rogue AP deployed in the neighborhood without using directional antennae and long range sensors.

Another advantage of the invention is that it enables the MSs to operate as mobile sensors to detect rogue AP. Mobile equipment can detect and report AP signals at the connection set-ups. Therefore, due to their mobility, dead zone on the detection coverage would be eliminated. Even directional rogue APs are detectable with the invention.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

This invention is directed to determining the legitimacy of an access point (AP) to a wireless network based on the consistencies in the received signal strength (RSS) reports from a mobile station (MS). In particular, it enables a MS with the help of a legitimate AP to recognize a rogue AP during the hand-over phase and/or whilst the communication is active. The invention is also concerned with using the MS as a mobile sensor, once the MS is in communication with a legitimate AP.

The term "hand-over" designates here the widely recognized operation of switching a call in progress from one AP to another, without disrupting the communication. This procedure is used to provide seamless service to a MS when the subscriber is moving to/from the respective area of coverage. During the hand-over, a rogue AP may masquerade a legitimate AP, so that the mobile user will lose the connection with the access network. The term "communication" here is used to designate the exchange of information between a MS and a remote entity after the MS gained access to the network through a selected AP.

A wireless access network consists of a number of APs, providing attachment to roaming wireless MSs. The APs are connected together on a separate backbone network which is used to exchange communication information. By design, each MS tries to get attachment through the AP that presents the strongest RSS. The RSS value measured by the MS for a certain AP is relative to every MS, since the distance between the same AP and two MSs is most probably different, and also since the MSs have most probably different sensitivities.

Figure 1:
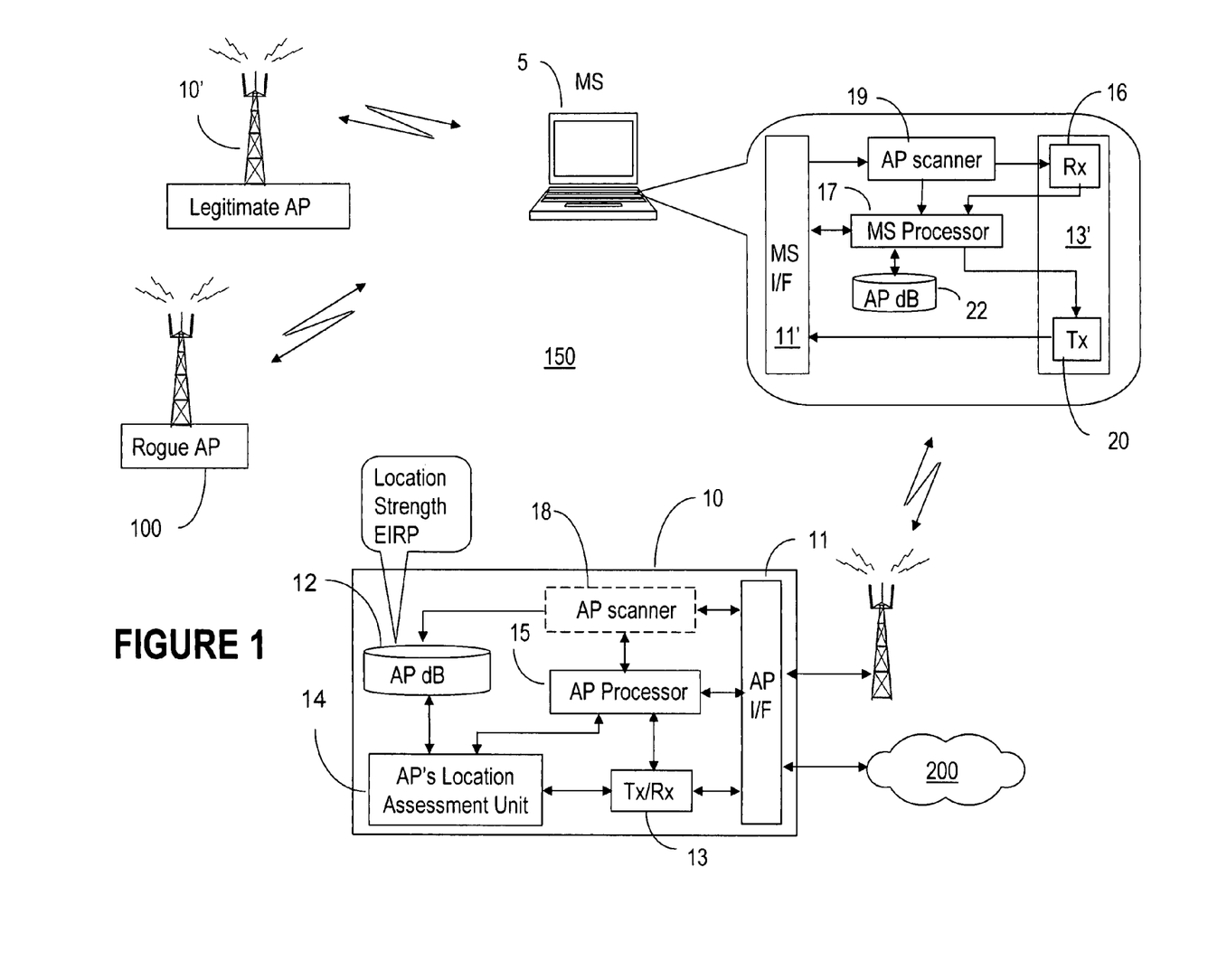
FIG. 1 illustrates a simple wireless network that includes a mobile station according to an embodiment of the invention.

FIG. 1 shows generically a wireless access network 150 that includes a MS according to an embodiment of the invention. The network in this example includes legitimate APs 10 and 10', a rogue AP 100 and a MS 5 that moves between the areas of coverage of these stations. The legitimate APs are connected to each other over a trusted physical network 150 and may also provide access to a wired network such as shown at 200. It is to be noted that only the units relevant to this invention are illustrated on the block diagram of the MS 5 and AP 10.

As known, the APs and the mobiles are equipped with a transceiver 13, 13' with a receiver 16 and a transmitter 20 (shown for the MS 5 only) for enabling two-way communications between MSs and APs over the interface 11, 11', and a respective processor 15, 17. Processors 15 and 17 generically illustrate all the functionality of the respective MS 5 and AP 10 that enables data communication and signaling between the mobiles and APs, and over network 200, including setting-up of a connection, hand-over, data transfer (communication), and other functionality that is not relevant as such to the invention.

In addition, all legitimate AP 10, 10' in the access network are also equipped with a neighbor database 12 that stores the location data for all APs in the access network 150, or at least the location of the closest neighbors. The AP location data may be determined in any known way, e.g. through a backbone network protocol or by configuration. This location information is kept in neighbors' database 12 in the form of e.g. a table, where each row provides a AP identifier (the MAC address, a AP index), the location of the respective AP, and the effective isotropic radiated power (EIRP); other control information about the respective neighbors may also be kept in the table. We assume that this information can be trusted.

According to the invention, the AP is also equipped with a APs location assessment unit 14 which calculates the current APs location data based on the information received from a mobile, such a MS 5 that roams within the area of coverage of AP 10. This APs location may be determined in different ways and at different stages of a call (hand-over or/and communication) in progress, as described in connection with FIGS. 2 to 5. The current AP location data is compared then with the location data stored in memory 12; if the data are consistent, the APs are considered legitimate. If not, a rogue AP is present in the respective neighborhood.

MS 5 is equipped with an AP scanner 19 for detecting the signal strength (received signal strength RSS) of the signals received from the APs in the respective area. Scanner 19 is shown as a separate unit, but of course, it could be part of receiver 16. The mobile maintains a database 22 that collects the RSS and direction information on the APs as detected by scanner 19, during operation as a mobile sensor as discussed later. In addition to the general tasks performed for establishing/ terminating a connection, handing-over the connection and the ensuing signaling, processor 15 collects the AP information from the scanner 19 and stores it in database 22. This information is retrieved for reporting, over transmitter 20, to the AP the mobile currently uses for access (serving AP). Since the stations are mobile, these capabilities enable MS operation as a mobile sensor in the access networks. As a result, the attackers would not be able to thwart this detection method simply by using directional antennas.

According to the invention, a MS makes a demand to its serving AP for a time interval during which the MS scans the frequencies and assesses the RSS of the available APs in the area; this is termed a scanning time interval. The serving AP replies to such a scanning interval demand with the recommended AP identifications, retrieved from database 12, based on the current location of the MS. During the scanning interval, the MS measures the RSS of the recommended APs. For example, the RSS is obtained by averaging the strength of the signal taken during the preamble of a frame. Once scanner 18 collects all the measurements, the MS transmits to the serving AP a report including the identity of the respective AP paired with the measured RSS.

Rogue AP detection may take place according to the invention both during the hand-over phase of a mobile call and/or whilst the communication is active. For rogue AP detection during the hand-over phase, the goal is to make sure that the signals received from a candidate APs for the hand-over phase are consistent with the real locations of that candidate. Whilst the communication is active, the goal is to detect and report the presence of all APs in the area; in this way the MSs operate as a mobile sensor in the access networks.

It is to be understood that the invention is not restricted to the processing of the RSS for detecting rogue AP's. Any other presence information that provides an indication of an AP operating in the roaming area of the MS, presence information that the mobile is able to collect and report to a serving AP may be used.

Rogue AP Detection During the Hand-over Phase

Figure 2:
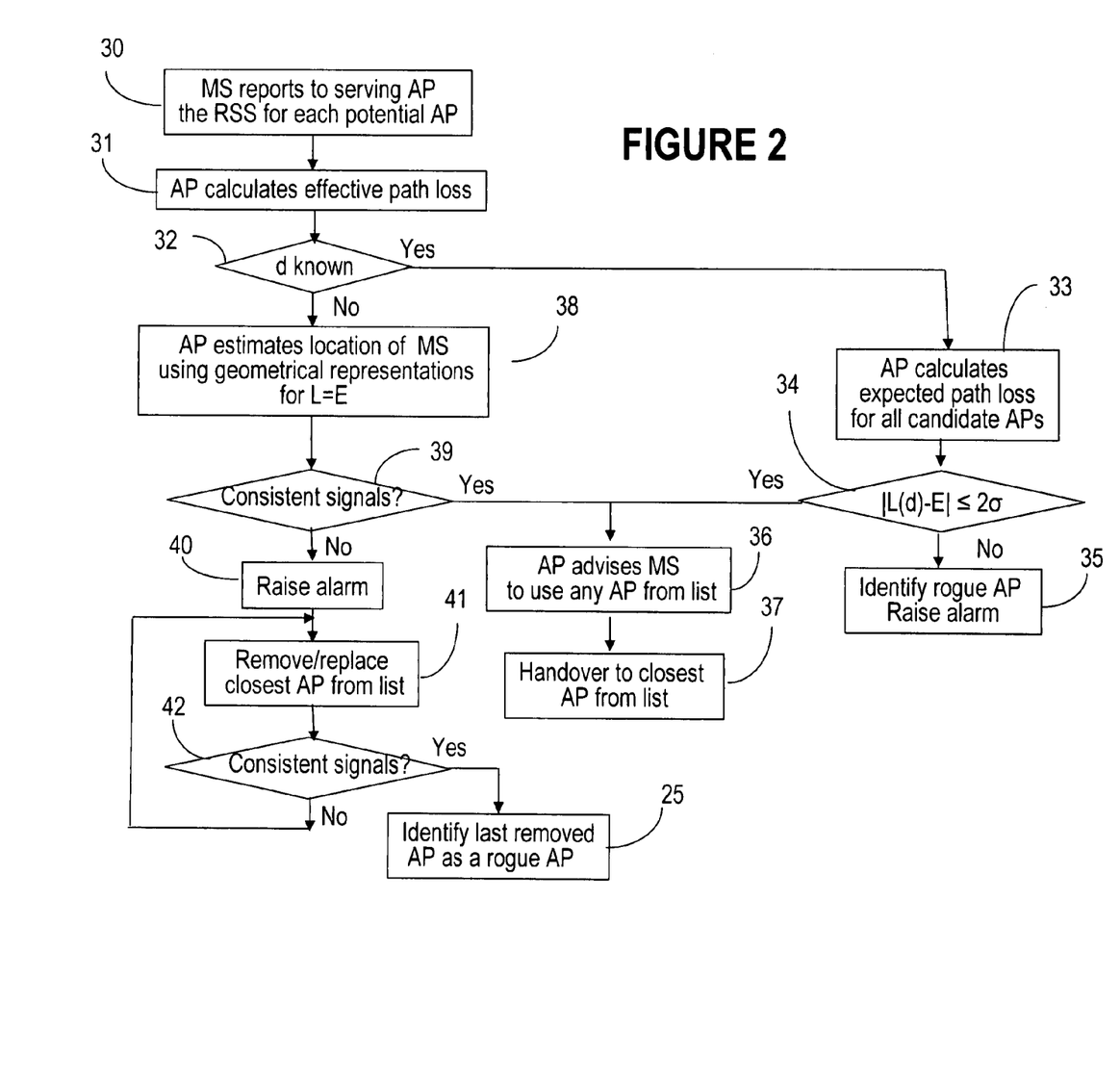
FIG. 2 shows a flowchart of the method of rogue access point detection during handover phase, the exact solution.

FIG. 2 shows a flowchart of the method of rogue AP detection during handover phase, illustrating the "exact solution". Let's say that the MS 5 of FIG. 1 connects to wireless 150 for communication with a fixed station over network 200. Also, let's assume that MS 5 uses AP 10 as the current AP and, as it leaves the area of coverage of AP 10, it looks for prospective AP able to seamlessly take-over the connection from AP 10. As seen in step 30, the MS 5 reports to the AP 10, all the APs that indicated the availability to take-over the access functionality currently performed by the serving AP 10.

The RSS measurements are then used at the serving AP to compute in step 31 the effective path loss for the signal between the MS and the respective APs. The effective path loss is determined using the EIRP of the candidate AP from the database 12, the RSS for that AP reported by the MS in step 30, and EQ1:

$$E = EIRP - RSS - G_r \qquad \text{EQ1}$$

where $G_r$ is the gain of the receive antenna of the MS.

As indicated above, the serving AP knows the location of the legitimate APs, which is pre-stored in database 12. In some cases, the AP may also know the current location of the MS. For example, if the MS is equipped with a GPS, the MS can provide its location to the serving AP. In this case the distance $d_i$ between the MS and a candidate $AP_i$ can be used to evaluate the expected path loss. This case is shown along branch "Yes" of decision block 32 of FIG. 2.

According to S. Rappaport and T. Rappaport book entitled "Wireless Communications: Principles and Practice, $2^{nd}$ Edition, Prentice Hall, 2001, the path loss L(d) in dB as a function of the distance d in meters, is a random variable following a normal distribution, given by EQ2:

$$L(d) = \overline{L}(d_0) + 10v\log\left(\frac{d}{d_0}\right) + X_\sigma \qquad \text{EQ2}$$

The term $d_0$ represents a reference distance close to the transmitter of the candidate AP. The average loss measured at that distance is $\overline{L}(d_0)$. The value v, which is termed the path loss exponent, ranges from 1.5 to 6. The path loss exponent captures the rate at which the strength of the signal is fading, and is determined using sampling. The term $X_\sigma$, is a Gaussian distributed random variable in dB with zero-mean and standard deviation σ. The distance is then used to calculate L(d), as shown in step 33.

It is known that the gap between L(d) and E is less than or equal to 2σ with a probability of 95%. This fact follows from the standard table of the normal distribution. It is therefore reasonable to expect that under attack, the calculated effective AP to MS path loss is much less than the average theoretical AP to MS path loss. Hence, the test for determining if a candidate AP is legitimate becomes:

$$|L(d)-E| \leq 2\sigma \qquad \text{EQ3}$$

With this technique, the theoretical rate of false-negatives is about 2.5%. The rate of the false positives depends on the additional RSS required by the attacker to succeed. In addition, if the AP uses sectorized antennae then the azimuth of the MS must be within the sector of the AP. If these tests fail, (which is highly improbable if the AP is legitimate), then the signal report for this AP should be considered anomalous.

If the test of EQ3 is not satisfied, branch "No" of decision block 34, it means that the respective AP is a rogue one, and the serving base station alarms the NMS of the presence of this rogue AP, step 35. If the test in EQ3 indicates that the AP is legitimate, branch "Yes" of decision block 34, it means that the RSS data received from the MS are consistent and the hand-over phase can choose any of the new reported APs, as seen in step 36. The serving AP then performs in step 37 the handover to the respective candidate AP selected in step 36.

Estimation of the path loss becomes more complex if the location of the MS is not known, i.e. only the location of the candidate APs are known, as shown by branch "No" of decision block 32. In this case, the calculation is preferably made using a geometrical representation of the signal strength, as shown in step 38. The approximate position of the MS may be represented as a disk, an annulus, a sector of a disk, a sector of an annulus, a line segment, etc, depending on the number of measurements for the respective prospective AP. Given a loss L the log-normal shadowing model can be used to compute a distance estimate d as:

$$d = d_0 10^{\frac{L(d_0)-L}{10v}} \qquad \text{EQ4}$$

Both loss L and distance d are random variables. The real distance from MS to the candidate AP is within the interval delimited by a minimum value $d_{min}$ and a maximum value $d_{max}$ with a probability grater or equal to 95%. The minimum and maximum distances are calculated using EQ5:

$$d_{\min} = d_0 10^{\frac{L(d_0)-L-2\sigma}{10v}} \qquad \text{EQ5}$$
$$d_{\max} = d_0 10^{\frac{L(d_0)-L+2\sigma}{10v}}$$

The above EQ5 follows from the fact that 95% of the time the maximum difference from the measured path loss and average path loss is 2 σ dB. It can be thus assumed that the MS is located with a probability of 95% in a region defined by an annulus centered at the location (s,y) of the candidate AP and with radii of $d_{min}$ and $d_{max}$. In this case, a calibration phase is required to determine the average short distance loss $\overline{L}(d_0)$, path loss exponent v and standard deviation σ.

Turning back to FIG. 2, following receipt of the RSS for each candidate AP in step 30, the serving AP determines the effective loss in step 31 using EQ1. The MS to $AP_i$ distance $d_i$ is estimated using EQ4 with the value of the effective loss used as the expected loss (L=E). The $d_{min}$ and $d_{max}$ values are calculated using EQ5. Each $AP_i$ defines an annulus $A_i$ centered at the respective location $(x_i, y_i)$ and with radii $d_{i,min}$ and $d_{i,max}$.

Figure 3:
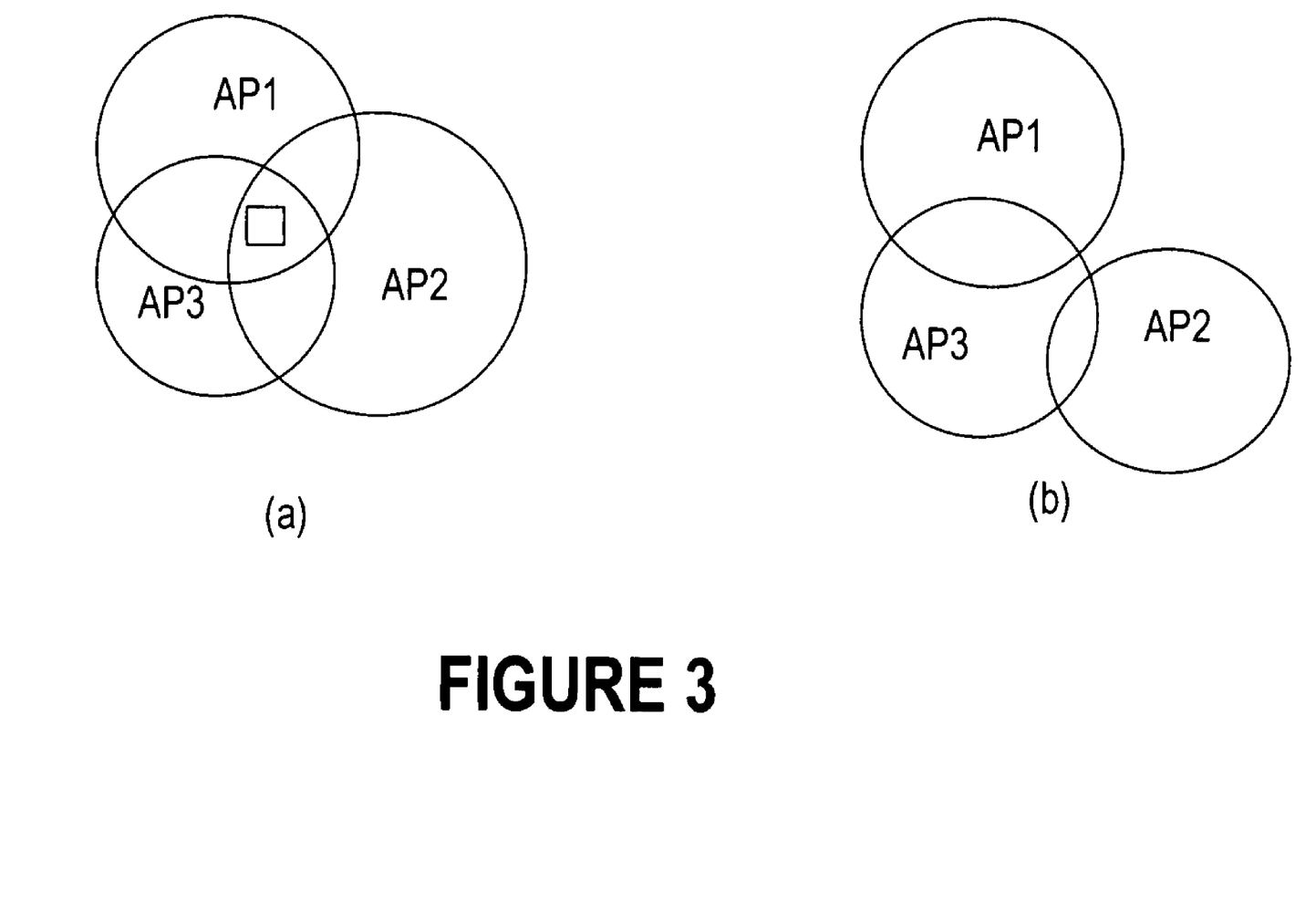
FIG. 3 shows how consistency of signals is determined on the flowchart of FIG. 2, where consistent signals are shown at (a) and in-consistent signals are shown at (b)

The signal consistency is assessed in step 39 based on the intersection of the annuli, as also shown in the examples of FIG. 3. If the annuli for all candidate APs have a non-empty intersection, as in FIG. 3(a), it means that there is an area (the intersection) where it is plausible for the MS to be located, because the RSS received for the APs in the neighborhood are consistent.

The detection may be further simplified by using in step 38 only the $d_{i,max}$ values. Each AP defines also a disk $D_i$ of radius $d_{i,max}$ centered at location $(x_i, y_i)$; FIG. 3 illustrates an example of a normal case and an anomalous case. In the normal case, the disks have a non-empty intersection and signal reports agree on a common area in which the MS should be located. In the anomalous case, the attacker imitates $AP_2$ with a substantially stronger RSS. This leads to the false interpretation that the receiver is much closer to $AP_2$ that it is in reality. Signal reports don't agree on a common area in which the MS should be located.

If the AP uses sectorized antennae, then the intersection of sectors must be verified instead of annuli or disks.

As indicated above, in order to uncover a rogue AP, the APs location assessment unit 14 of the AP 10 performs an intersection of all geometric representations (annuli, or circles, or sectors, etc) computed in step 38 for the respective candidate APs, as shown in step 39. Verification of disk, annulus and sector intersection can be performed by resolving a set of respective equations to find a solution $(x_i, y_i)$ for the position of each AP.

If the intersection of the geometric representations is not empty, branch "Yes" of decision block 39, it means that the RSS data received from the MS are consistent and the hand-over phase can choose any of the new reported APs, as seen in step 36. Now, the handover may proceed and the closest candidate AP becomes the new serving AP. FIG. 3(a) shows an example when the signals are consistent.

If on the other hand the signals are not consistent, as shown in FIG. 3(b) and by branch "No" of decision block 39, the AP will raise an alarm signal to the network management system (not shown), as indicated in step 40. In order to determine which of the prospective APs is the rogue AP, the serving AP attempts to determine a maximal cardinality subset of the geometric representations which have a non empty intersection. Assuming there is only one rogue AP in the list, one AP is simple selected from the list, removed, as shown in step 41 and the common intersection of the remaining geometric representations is computed again, step 42. If the common intersection is still empty, replace the related AP in the list and remove another AP from the initial list. Steps 41-42 are repeated until the signals become consistent, in which case the last removed AP is the rogue one, as shown in step 25. The hand-over may be refused altogether at any time if the distances are not consistent.

It is to be noted that other ways of determining which AP introduces discrepancies in the distances. For example two or more APs may be removed simultaneously from the list rather than one, or the serving AP may use some selection criteria for selecting the order of AP removal from the list, etc. Such strategies may attempt e.g. to speed the rogue AP detection process, or to identify the rogue AP with more accuracy, etc.

Since detection of a rogue AP must be completed during a communication hand-over period, a faster solution may be used. While this fast solution is not very accurate, it may however be used in conjunction with the exact solution to eliminate some of the worst rogues. The fast solution relies on a pre-processing step which uses a Voronoi diagram. This diagram provides partitioning of a plane with n generating points into convex polygons such that each polygon contains exactly one generating point, and every point in a given polygon is closer to its generating point than to any other generating point. The known locations of the trusted APs are used as generating points. The corresponding Voronoi diagram is invariant while the network topology is fixed and can be pre-computed in time complexity O(nlogn).

Figure 4:
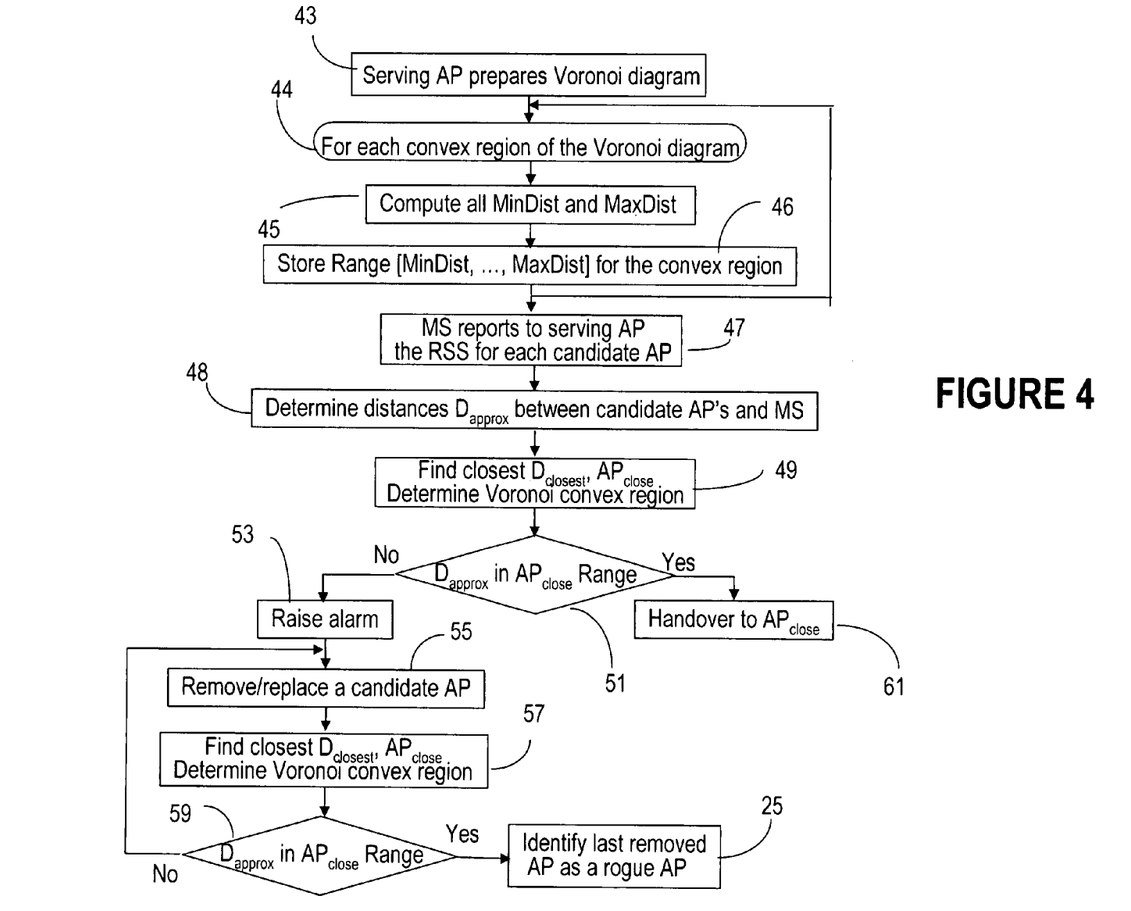
FIG. 4 shows a flowchart of the method of rogue access point detection during handover phase, the fast test solution.

FIG. 4 shows a flowchart of the method of rogue AP detection during handover phase, fast test solution. In step 43, the serving AP computes the Voronoi diagram of the points representing the location of the APs pre-stored in memory 12. As shown for the loop 44-47, for each convex region of the Voronoi diagram, the AP computes the minimum and the maximum distances between any point of this convex region and each other generating point. The distances are stored in database 12 for each convex region.

As in the example shown in FIG. 2, the MS reports to the serving AP the RSS for each candidate AP step 47. In step 48, the AP calculates the approximate distance between the current location of the MS and the candidate AP, based on the characteristics of the APs and the measured RSS. These approximations define distance ranges. In step 49, the serving AP identifies a candidate $AP_i$ which is supposed to be the closest one to the current location of the MS. The shortest distance $d_i$ enables the serving AP to determine the corresponding convex region on the Voronoi diagram in which the MS should be. Next, in step 51 AP determines if the distance ranges determined in step 45 for $AP_i$ are consistent with the distances computed in step 49. If the distances correspond, branch "Yes" of decision block 51, than the handover is performed in step 61. Otherwise, the exact solution may still be executed now for a more accurate determination.

If not, branch "No" of decision block 51, the AP raises an alarm, shown in step 53 to the network management system of the access network. Then, the serving AP attempts to determine a maximal cardinality subset of AP which have coherent distances. Assuming there is only one rogue AP in the area, one AP is randomly selected and removed, step 55. For example, this could be the closest candidate AP identified in step 49. The candidate base station that is now the closest one to the MS is determined as before, and the corresponding convex polygon for the new closest candidate AP is identified, in step 57. If the distances are not coherent, decision block 59, the chosen AP is again replaced and another AP is removed; steps 55, 57 and 59 are repeated until the distances become consistent. In this case, the last removed AP is identified as the rogue AP, step 25. The hand-over may be refused altogether at any time if the distances are not coherent.

It is to be noted that other ways of determining which AP introduces discrepancies in the distances may be used. For example two or more APs may be removed simultaneously from the list rather than one, or the serving AP may use some selection criteria for selecting the order of AP removal from the list, etc. Such strategies may attempt e.g. to speed the rogue AP detection process, or to identify the rogue AP with more accuracy, etc.

Rogue AP Detection Whilst the Communication is Active

Figure 5:
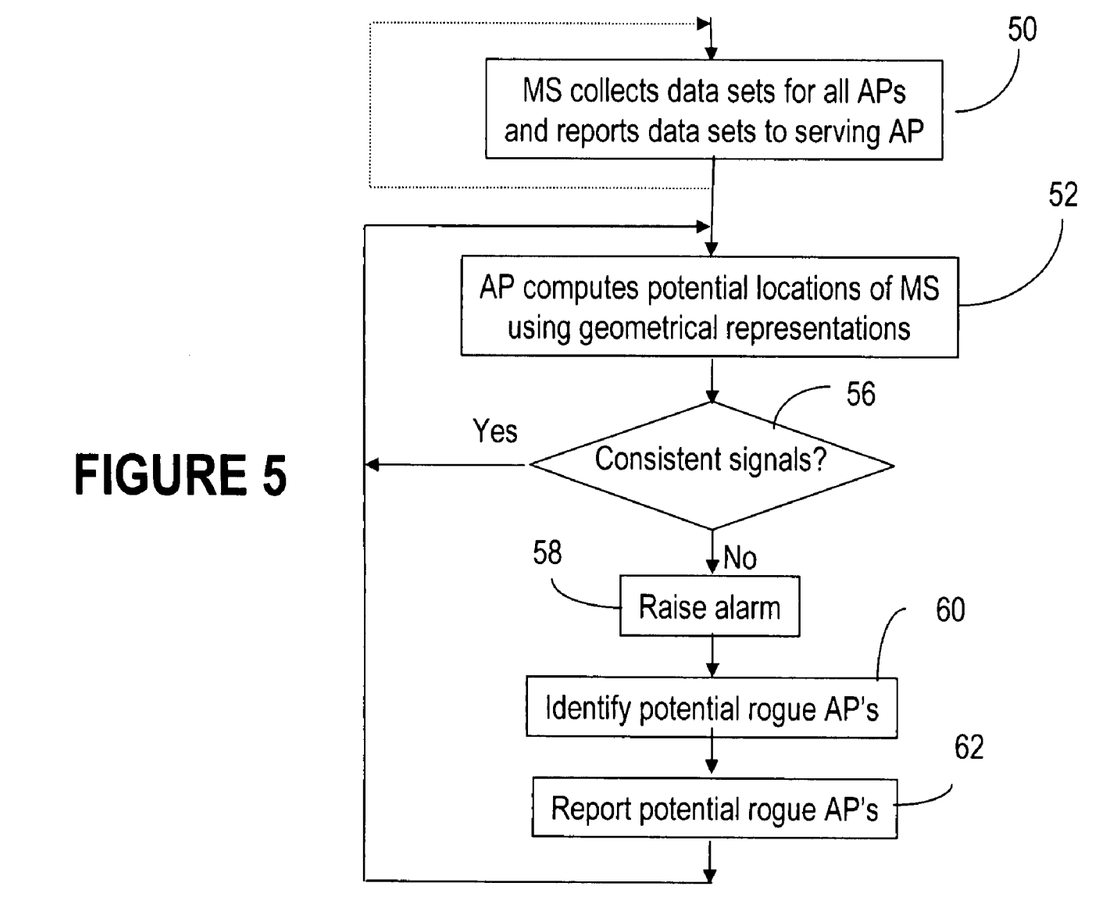
FIG. 5 shows a flowchart of the method of rogue access point detection whilst the communication is active.

FIG. 5 shows a flowchart of the method of rogue AP detection whilst the communication is active. Once a mobile user has been established a communication with a legitimate AP, the AP may want to detect any potential rogue APs reported by the mobile user. In such a case, the MSs become mobile sensors trying to detect rogue APs in the access networks. Evidently, there is no real need of a fast test at this stage of the connection, so that the detection process can be done off-line the AP—mobile user communication establishment.

The mobile collects the RSS from all the APs in the area and reports this information to the serving AP, step 50. It is to be noted that step 50 is performed continuously, as the mobile roams within the service area of AP, as shown by dotted line on the flowchart of FIG. 5. The reports include the information collected by the MS for all APs in the respective area and may be made periodically, or when requested by the serving AP; other arrangements may equally be envisaged. The information includes at least a data set with an identification of the respective APs and the corresponding RSS (e.g. AP1-RSS1; AP2-RSS2 . . . APn-RSSn). The time when the respective data set has been collected may also be recorded.

For each data set reported by the mobile user, the serving AP computes the approximate location of the mobile user, step 52. This determination is performed based on the characteristics of the respective candidate AP and the strength of the signal received by the mobile user. The approximate location of the MS with respect to the AP can be represented as before using a geometrical representation, such as a disk, an annulus, a sector of a disk, a sector of an annulus, a line segment.

Next, the serving AP determines for a given data set, if the RSSs received from the MS are consistent with its knowledge of the legitimate APs in the respective area. This is done by intersecting all the geometric representations computed in step 52. If the intersection is not empty, it means that the signals of the given data set received from the MS are consistent and no reported AP seems to be a rogue one. As shown by branch "Yes" of decision block 56, steps 50, and 56 are repeated for each data set reported by the MS.

If on the other hand the signals in the given data set are not consistent, as shown by branch "No" of decision block 56, the serving AP raises an alarm to the network management system, step 58. Then, the serving AP attempts to determine the identity of the rogue AP by determining the maximal cardinality subset of the geometric representations which have a non empty intersection, as described above.

Each legitimate AP uses this method to monitor the access network. If a given AP is reported too often and, eventually, by too many APs, the central network management acts accordingly and asks to all legitimate APs in the access network to identify the corresponding AP as at risk. Furthermore, the network management systems through the legitimate APs can download a black list of the at risk AP identifiers in the MSs. Then, the APs and the MSs can implement some security policies such as use an at risk AP only if no other possibility.

We claim:

1. A method for a mobile station (MS) to detect a rogue access point (AP) in a wireless access network containing legitimate APs, comprising:
   maintaining at each legitimate AP of said wireless access network, a neighbor database containing AP data for all legitimate APs in a service area;
   requesting, from said MS roaming in said service area, a handover from a serving AP to one of a list of candidate APs in said service area;
   collecting, at the MS, AP presence information from all of said candidate APs, and reporting said AP presence information to said serving AP;
   calculating an effective path loss value for each candidate AP;
   determining whether a distance between the MS and a particular candidate AP is known, and, when the distance is known:
      calculating an expected path loss value for the particular candidate AP;
      comparing the effective oath loss value to the expected path loss value for the particular candidate AP; and
      determining that the particular candidate AP is a rogue AP when the effective path loss value and the expected path loss value have a mismatch greater than a threshold when the distance is unknown;
   determining, at said serving AP, if said AP presence information is consistent with said AP data maintained at said serving AP;
   when said AP presence information and said AP data are inconsistent, randomly removing one candidate AP from the list of candidate APs, and repeating the removal step until the AP presence information is consistent with the AP data maintained at the serving AP; and
   identifying the last removed candidate AP as the rogue AP.

2. The method of claim 1, wherein said AP presence information includes for each candidate AP, a received signal strength (RSS) value associated with a respective AP identification (ID).

3. The method of claim 2, wherein said AP data includes, for each candidate AP in said service area, an identification (ID) of said respective AP associated with AP location data an effective isotropic radiated power (EIRP) value of said respective AP.

4. The method of claim 3, further comprising:
   calculating the effective path loss value based on the respective RSS and EIRP values for said particular candidate AP.

5. The method of claim 3, further comprising:
   calculating an effective path loss based on the respective RSS and EIRP values for said particular candidate AP; and
   estimating the distance between said MS and said particular candidate AP based on the effective path loss.

6. The method of claim 4, further comprising;
   using a scanner to determine the distance.

7. The method of claim 4, further comprising:
   advising said MS to use said particular candidate AP if the expected path loss is consistent with said effective path loss for said particular candidate AP.

8. The method of claim 5, further comprising: determining if an assumed current location of said MS is consistent with the AP data.

9. The method of claim 5, further comprising:
   estimating the distance of said MS between a minimum distance and a maximum distance.

10. The method of claim 8, further comprising:
    advising said MS to use any of said candidate APs if said assumed current location of said MS is consistent with the AP data.

11. The method of claim 8, further comprising:
    randomly selecting a candidate AP and removing said selected candidate AP from said list;
    determining if said estimated distance recalculated without the RSS value for the removed candidate AP is consistent with the AP data; and
    advising said MS to use any of said candidate APs except the removed candidate AP if the expected path loss is consistent with said effective path loss.

12. The method of claim 9, further comprising:
    electing a probability that said estimated distance is equal to an actual current distance between said MS and said candidate AP;
    calculating said minimum and maximum distance according to said probability and the effective path loss for the candidate AP; and
    providing a geometrical representation of said minimum and said maximum distances for all candidate APs.

13. The method of claim 11, further comprising:
    replacing said removed candidate AP with another AP from said list of candidate APs.

14. The method of claim 12, wherein said geometrical representation comprises a plurality of annuli, wherein each candidate AP is in the center of a respective annulus having radii equal to said minimum and said maximum distances, respectively.

15. The method of claim 12, wherein said geometrical representation comprises a plurality of disks, wherein each candidate AP is in the center of a respective disk having a radius equal to said maximum distance.

16. The method of claim 12, wherein said geometrical representation comprises a plurality of sectors, for candidate APs that are equipped with sectorized antennae.

17. The method of claim 12, further comprising:
    determining if said geometrical representation has a non-empty intersection, indicating that it is plausible for the MS to be located within an intersection area.

18. A method for a mobile station (MS) to detect a rogue access point (AP) in a wireless access network, containing legitimate APs, comprising:
    maintaining at each legitimate AP of said wireless access network, a neighbor database containing AP data for all legitimate APs in a service area;
    collecting, at the MS roaming in said service area, a data set including a received signal strength (RSS) value for a list of candidate APs in said service area, and reporting said data set to a serving AP;
    calculating an effective path loss value for each candidate AP;

determining whether a distance between the MS and a particular candidate AP is known, and, when the distance is known:

calculating an expected path loss value for the particular candidate AP;

comparing the effective path loss value to the expected path loss value for the particular candidate AP; and     determining that the particular candidate AP is a rogue AP when the effective path loss value and the expected path loss value have a mismatch greater than a threshold when the distance is unknown:

determining at said serving AP if the RSS value in said data set is consistent with said AP data maintained at said serving AP;

when the RSS value in said data set and said AP data are inconsistent, randomly removing one candidate AP from the list of candidate APs, and repeating the removal step until the AP presence information is consistent with the AP data maintained at the serving AP; and     identifying the last removed candidate AP as the rogue AP.

19. The method of claim 18, wherein said AP data includes, for each AP in said service area, an identification (ID) of said respective AP, associated with AP location data and an effective isotropic radiated power (EIRP) value of said respective AP.

20. The method of claim 18, wherein said data set includes for all APs in said service area, an ID of each said AP and the RSS value.

21. The method of claim 18, further comprising advising said MS to use the candidate AP in said data set if the expected path loss is consistent with said effective path loss value for all said paths.

22. The method of claim 19, further comprising:

calculating the effective path loss value based on the respective EIRP and RSS values for the particular candidate AP;

estimating the distance between an assumed current location of said MS and the particular candidate AP based on the effective path loss value;

determining if said assumed current location of said MS is consistent with the AP data; and     advising said MS to use the candidate AP if said assumed current location of said MS is consistent with the AP data.

\* \* \* \* \*

UNITED STATES PATENT AND TRADEMARK OFFICE
CERTIFICATE OF CORRECTION

| | | |
|---|---|---|
| PATENT NO. | : 7,716,740 B2 | Page 1 of 1 |
| APPLICATION NO. | : 11/242884 | |
| DATED | : May 11, 2010 | |
| INVENTOR(S) | : Jean-Marc Robert and Michel Barbeau | |

It is certified that error appears in the above-identified patent and that said Letters Patent is hereby corrected as shown below:

Column 11, Claim 1, line 31, please change "oath" to "path".

Signed and Sealed this

Fifteenth Day of June, 2010

David J. Kappos
*Director of the United States Patent and Trademark Office*